April 5, 1966 D. W. JOHNSON 3,243,885
SINE PLATE
Filed May 27, 1963 3 Sheets-Sheet 1
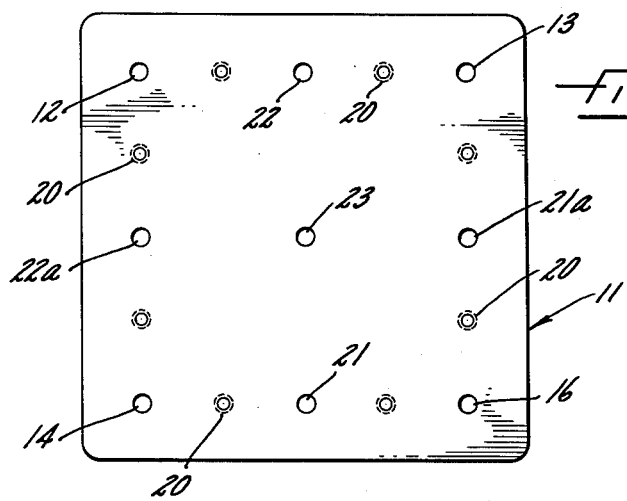
Fig.1.
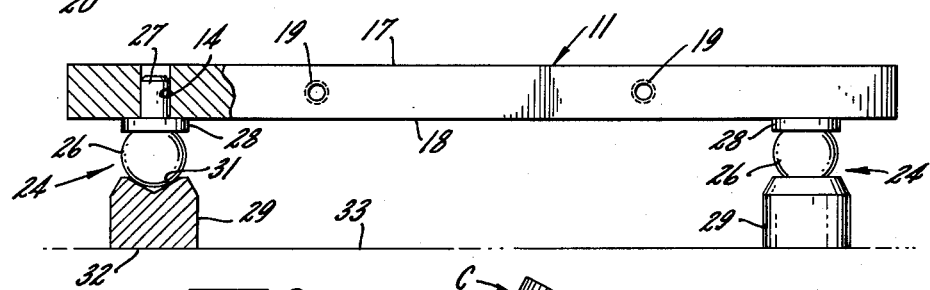
Fig.2.
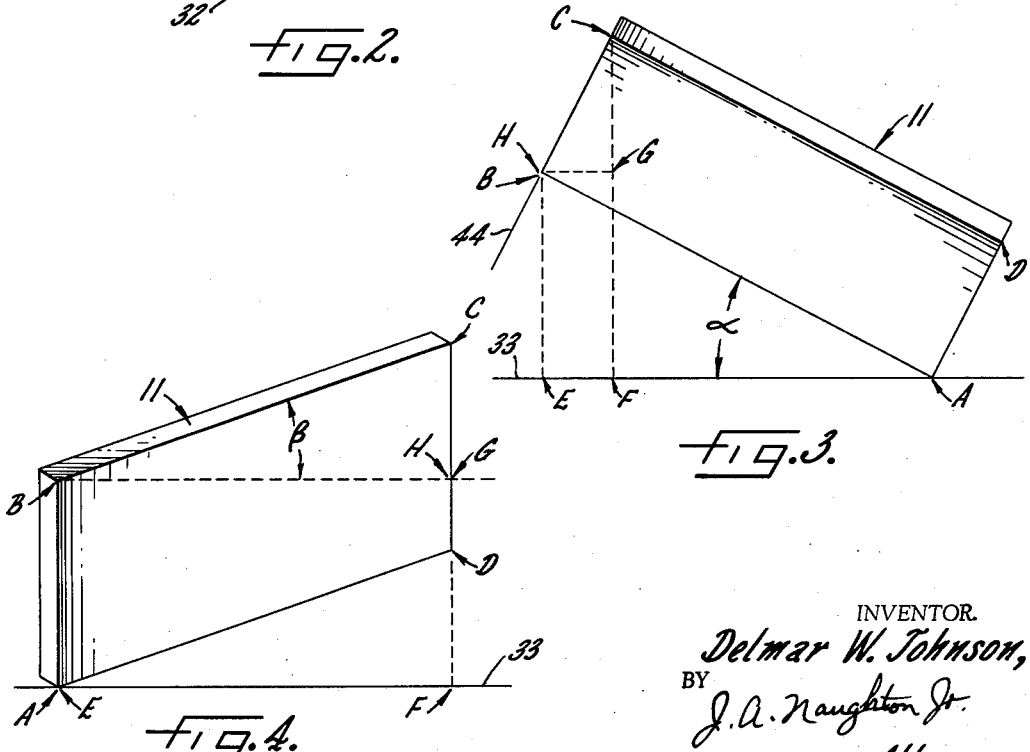
Fig.3.
Fig.4.
INVENTOR.
Delmar W. Johnson,
BY
J. A. Naughton Jr.
Attorney.

April 5, 1966 D. W. JOHNSON 3,243,885
SINE PLATE
Filed May 27, 1963 3 Sheets-Sheet 2
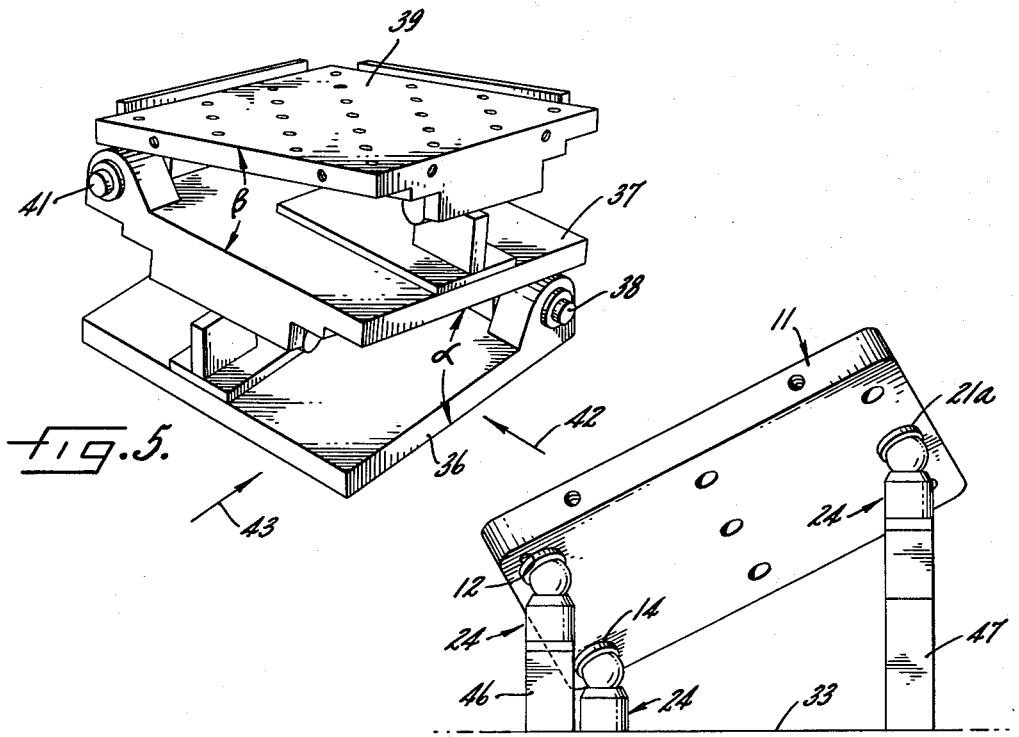
fig.5.
fig.6.
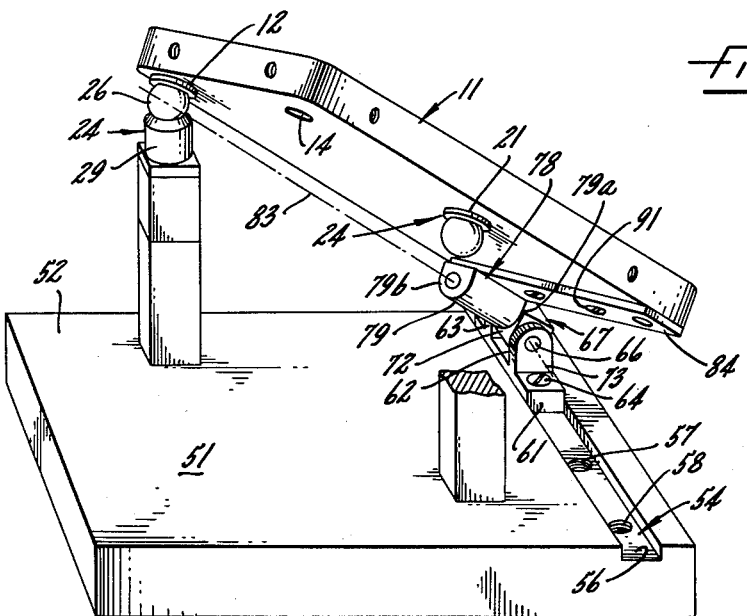
fig.7.
INVENTOR.
Delmar W. Johnson,
BY J. A. Naughton Jr.
Attorney.

April 5, 1966 D. W. JOHNSON 3,243,885
SINE PLATE
Filed May 27, 1963 3 Sheets-Sheet 3

INVENTOR.
Delmar W. Johnson,
BY J. A. Naughton Jr.
Attorney.

United States Patent Office 3,243,885
Patented Apr. 5, 1966

3,243,885
SINE PLATE
Delmar W. Johnson, Indianapolis, Ind., assignor of one-half to Joseph A. Naughton, Jr., Indianapolis, Ind.
Filed May 27, 1963, Ser. No. 283,276
3 Claims. (Cl. 33—174)

This invention relates generally to manufacturing and inspection tools and devices and more particularly to means and a method for measuring and establishing compound angles in manufactured parts.

In industry, compound angles are quite commonly found in gears, machine tool cutters, pumps and other products. Where the product having the compound angles is a high production item, it is common to have special machines and gages to check the compound angles. Frequently, however, the type of product or the number produced is such that special machines and gages, together with the expense which they imply, are not warranted. In these cases, conventional sine plates can sometimes be used with clamping devices in performing the machining operations, and conventional sine plates can be used in checking parts for accuracy of the compound angles therein.

Compound angles can be checked by using compound sine angle plates and standard gage blocks. These plates include a base plate with a first angle plate hinged thereto. Various predetermined angles can be established between the plates. A second plate is hinged to the first angle plate whereby a second angle (between the first and second angle plates) in a plane normal to the plane of the first angle, can be given any desired angle value. A part having a compound angle thereon to be checked, can be secured to the second angle plate and, by using a table of sine bar constants, gage blocks in the necessary sizes and numbers can be placed between the first angle plate and the second angle plate and the base plate to set up the part for checking with a dial indicator.

Conventional compound angle sine plates are large, cumbersome and expensive devices. Therefore, there has been a need for an inexpensive device suitable for checking parts having compound angles. Also, conventional compound sine angle plates are much too large for use in setting up parts on small grinders. Yet there are many instances in which the size of the part to be ground warrants the use of a small grinder. Also, there is a need in trade schools for an inexpensive and yet accurate means of teaching the making and checking of compound angles.

A device intended to measure single and compound angles is disclosed in the patent to Seidel, No. 2,306,227. While overcoming some of the disadvantages of the conventional compound sine angle plates, still further advances are required to provide an acceptible substitute for the conventional compound sine angle plate.

It is therefore a general object of this invention to provide improved means and method for obtaining and checking compound angles and other physical characteristics of items.

A further object is to provide a simple, accurate, inexpensive, and durable device for achieving the foregoing object.

A further object is to provide such a device which is further characterized by suitability for mounting to a machine tool for manufacturing parts.

A further object is to provide a single device capable of achieving the foregoing objects and capable of left hand and right hand compounding.

Other objects, advantages, and features of the invention will become apparent upon study of the claims and description herein along with the drawings wherein:

FIG. 1 is a top plan view of a sine plate according to this invention representing a typical embodiment thereof.

FIG. 2 is a front elevation of the sine plate of FIG. 1 with a portion broken away to illustrate certain details.

FIG. 3 is a schematic front elevation of the sine plate of FIG. 1 set up in an oblique plane as it would be to check a compound angle.

FIG. 4 is a schematic left hand side elevation of the setup of FIG. 3.

FIG. 5 is a perspective view of a conventional compound sine angle plate.

FIG. 6 is an elevational view illustrating the use of a typical embodiment of the sine plate of the present invention according to an isoceles triangle arrangement.

FIG. 7 is a perspective view of the sine plate adapted to machining operations according to the present invention.

Figure 8:
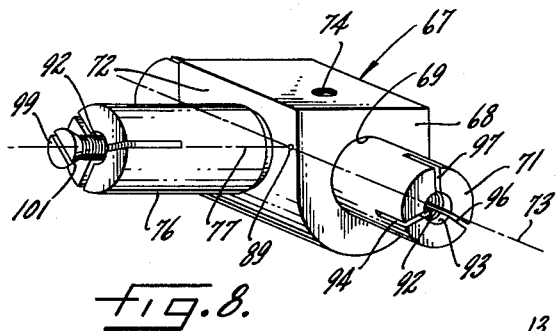
FIG. 8 is an enlarged perspective view of a portion of the embodiment of FIG. 7.

Referring to FIG. 1 and FIG. 2, the sine plate 11 is typically rectangular in form. It is finish ground all over. There are four finished apertures 12, 13, 14, and 16 through the plate. They are all of equal size and the axis of each is normal to the parallel faces 17 and 18 of the plate. The four apertures are equally spaced so that their centers define the corners of a square. They can be spaced such that they define a rectangle. The distance between any two apertures adjacent one edge of the plate is the sine distance and may be any distance desired. A typical distance is five inches.

Threaded apertures 19 are provided in the side and end walls of the plate to accommodate screws for securing side rails to the plate in a manner familiar to those skilled in the art. This is sometimes desirable to assist in the location and securing of a workpiece to the sine plate.

A finished aperture 21 is located on a line between apertures 14 and 16 and equidistant between them. It is of the same size as apertures 14 and 16. Likewise aperture 22 is provided on a line between apertures 12 and 13 and equidistant between them. Identical apertures 21a and 22a are provided. Aperture 21a is equidistant between apertures 13 and 16. Aperture 22a is equidistant between apertures 12 and 14. As will become apparent, three of the four apertures 21, 22, 21a and 22a can be omitted, if desired but four are shown for convenience in description and illustration.

A finished aperture 23 of the same size as the others is disposed at the intersection of diagonal lines drawn between the apertures adjacent the corners of the plate. Two pairs of threaded apertures 20 are provided adjacent opposite edges of the plate for purposes which will become apparent.

A ball support 24 may be employed in each of the four apertures 12, 13, 14 and 16. Normally only three of the apertures are provided with a ball support. A ball support of the type shown in the patent to Hall, No. 2,419,134, may be used. It is important that the ball 26 be uniform and precisely spherical. The stem 27 must precisely fit its aperture. The distance between the shoulder 28 and the center of the sphere must be precise and the plane of the shoulder must be precisely normal to the axis of the stem. The support blocks 29 may be used if desired to minimize wear or damage to the balls. The conical recess 31 of the block should precisely fit the ball.

The base 32 of the support block is, of course, flat. The support blocks rest on the surface 33 which may be the top of a surface plate. The conical or V-shaped recesses in all of the support blocks are the same in size and relationship to the bases. Therefore they support the ball supports with their spherical centers at uniform heights from the bases of the support blocks.

It is a purpose to employ the sine plate of the present invention not only to check single angles but also to check a part for correct attitude of a surface whose attitude can be defined by two angles measured in perpendicular planes, with one plane being perpendicular to a plane of reference which will be understood throughout this description to be a horizontal plane such as the top of a surface plate, for example.

Referring to FIGS. 3 and 4 of the drawings, which are schematic in nature, the sine plate 11 of the invention may be considered supported at three points, A, B, and C. This is equivalent to supporting the plate by three ball supports 24 (FIG. 2) mounted to apertures 13, 12, and 14, for example. Also, by way of example, the distance between points A and B is a fixed sine distance of known value. Likewise, the distance between points B and C is a fixed sine distance of known value.

The distance between points A and B, AB, equals the distance between points C and D, CD. A line connecting points A and B is perpendicular to the line connecting points B and C. Thus the lines of lengths AB, BC, CD, and DA form a rectangle. It is desired to find the height of gage blocks which, when supporting points B and C, with point A resting on a surface plate 33, place the sine plate at an orientation which can be described by a first and second angle in the use of a conventional compound angle sine plate.

FIG. 5 is a perspective view of a conventional compound sine angle plate. It includes a base plate 36 intended to rest on a surface plate. A first sine plate 37 is hinged at 38 to the base plate. The angle between the first sine plate 37 and the surface plate will be referred to herein as the first angle and will be given the reference character $\alpha$. It is, of course, measured in a plane perpendicular to the axis of hinge 38.

A second sine plate 39 is connected by the hinge 41 to the first sine plate. The angle between the second sine plate and the first sine plate will be referred to herein as the second angle and will be given the reference character $\beta$. It is measured in a plane which is perpendicular to the axis of hinge 41.

Referring now to FIGS. 3 and 4, the attitude of the sine plate 11 therein corresponds precisely to the attitude of the second sine plate 39 of FIG. 5. FIG. 3 is a elevation and may be compared to FIG. 5 when viewed in the direction of arrow 42 in FIG. 5. FIG. 4 is a left-hand side elevation of the setup of FIG. 3 and may be compared to a view of the angle plate of FIG. 5 looking in the direction of the arrow 43. In FIGS. 3 and 4, point E is a point on the surface plate directly below point B. Point F is a point on the surface plate directly below point C. Point G is a point in space directly below point C and at the same elevation as point B. Point H is a point in space at the same elevation as point B and lying in a plane which is perpendicular to the surface plate and in which lies the line connecting points C and D.

The first angle $\alpha$ lies in a plane perpendicular to the surface plate and in the plane of the paper in FIG. 3. It corresponds to the first angle in FIG. 5. The second angle $\beta$ lies in plane 44 of FIG. 3 which is perpendicular to the plane of the paper in FIG. 3. It is the angle between the line connecting points C and B, and the line connecting points B and H.

(1) $BE = AB \sin \alpha$
(2) $CF = CG + GF$
(3) $GF = BE$
(4) $CH = BC \sin \beta$
(5) $CG = CH \cos \alpha$
(6) Substituting (4) in (5), $CG = BC \sin \beta \cos \alpha$
(7) Substituting (1) in (3), $GF = AB \sin \alpha$
(8) Substituting (6) and (7) in (2), we obtain
(9) $CF = BC \sin \beta \cos \alpha + AB \sin \alpha$.

In the case where both sine distances are the same,

(10) $BC = AB$. Then, substituting (10) in (9), we get
(11) $CF = AB (\sin \beta \cos \alpha + \sin \alpha)$.

Expressed in words, for the case where the sine distances are unequal, the height of the gage blocks under the point C is equal to the second sine distance times the sine of the second angle times the cosine of the first angle, plus the first sine distance times the sine of the first angle.

Expressed in words for the case where the first sine distance equals the second sine distance, the height of the gage blocks under point C is equal to the sine distance times the sum of: The sine of the first angle and the product of the cosine of the first angle times the sine of the second angle. Expressed in another way, the height is equal to the cosine of the first angle times the sine of the second angle, plus the sine of the first angle, the sum of these two quantities being multiplied by the sine distance.

If it is desired to support the plate by a stack of gage blocks under point D rather than point C, the height of the gage blocks under point D is equal to the sine of the second angle times the cosine of the first (or base) angle times the sine distance.

Referring to FIG. 6, sine plate 11 is employed according to an arrangement of supports different from that heretofore described. Ball supports 24 are mounted to the usual apertures 12 and 14 but also to aperture 21a. The supports are, therefore, arranged in an isoceles triangle. This arrangement is sometimes found most satisfactory for properly supporting the sine plate on three points when an object to be checked is of a configuration tending to require this type of support.

In the use of the sine plate in this manner, the ball support mounted to aperture 14 rests directly upon the surface plate 33. A stack of gage blocks 46 supports the support mounted to aperture 12. A stack of gage blocks 47 supports the ball support which is mounted to aperture 21a. The height of the stack 46 is equal to the sine distance times the sine of the first angle. The height of the stack 47 is equal to the sine distance times the sine of the second angle times the cosine of the first angle, plus one half the sine distance times the sine of the first angle.

Figure 9:
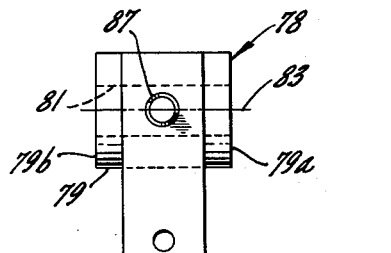
FIG. 9 is a top plan view of a portion of the embodiment of FIG. 7.

Referring to FIGS. 7, 8, and 9, means are shown for employing the present invention in a machining or grinding operation. A base plate having precisely parallel upper and lower surfaces 52 and 53 respectively, may be made of a ferromagnetic material such as iron or steel, for example. It is thereby well adapted to be secured to the magnetic table of a surface grinder or other machine. A groove 54 is provided in the upper surface 52. The floor 56 of the groove is flat and parallel to the top of the plate 51. Four tapped holes are provided in floor 56, two of these (57 and 58) being located near one end of the groove. The two others are located near the other end of the groove.

A yoke 61, having two upstanding arms 62 and 63 is secured in the groove. Two screws are used to secure the yoke to the plate, screw 64 being visible in the drawing. The two threaded holes such as 57 and 58 but located adjacent the opposite end of the groove, are used for the two screws securing the yoke to the plate in the position shown in the drawing. A precisely sized hole is provided in each arm of the yoke, such as hole 66. The holes in the arms are aligned so that they have a common axis parallel to the surface 52.

A pivot member 67 is mounted to the yoke. This member includes a block 68 having an aperture 69 therethrough with a hinge pin 71 extending therethrough in precisely fitting relation and extending from each end of the block. A shoulder surface 72 of the block is flat and is parallel to the axis 73 of the pin 71. The pin may be securely retained in the block by a set screw (not shown) in the threaded aperture 74. A second pin 76 is mounted to the block 68. The axis 77 of this pin intersects axis 73 and is precisely perpendicular to the surface 72.

Sine plate connector 78 is mounted to the pivot member 67. This connector includes a block 79 having an aperture 81 therein which precisely fits the pin 76. A plate 84 is permanently secured to the block 79 and has an upper surface 86 which is flat and parallel to the axis 83.

Parallel upstanding mounting pins 87 and 88 are secured to the plate 84. They are spaced apart a distance equal to the sine distance of the sine plate 11. Pin 87 is round and precisely fits the aperture 13 (FIG. 1). Pin 88 is oblong and its dimension perpendicular to a line between pins 88 and 87 is the same as the diameter of the pin 87. This is the greatest dimension of the pin 88. The screws 91 threadedly received in threaded holes 20 of the sine plate secure the plate 84 thereto. Thus it is seen that the sine plate is securely and precisely mounted and fitted to the plate 84 and pins 87 and 88.

The perpendicular distance between the upper face 86 of plate 84 and the axis 83 is equal to the distance between the center of each of the ball support balls and the bottom of the sine plate. Accordingly, the distance from the intersection of the axes 73 and 77 to the bottom of the sine plate also equals the distance from the support ball centers to the bottom of the sine plate.

The faces 79a and 79b on block 79 are parallel to each other and perpendicular to the aperture 81 therein. Also they are equidistant from a plane through the centers of pins 87 and 88 and parallel to faces 79a and 79b. This permits use of the connector 78 for right-hand and left-hand compounding. In FIG. 7 the face 79a meets and rests on surface 72. The faces 72 and 79a are at known distances with respect to the axis 73 and pin 87 respectively. The parts are made such that the sum of these distances is an inch or an integral multiple of an inch. In this manner, this sum can be added to the distance between pin 87 and the support in aperture 12 to establish the sine distance in this direction for use in obtaining the appropriate heights of gage blocks under the ball supports.

Therefore the same formulas as set out above can be used to determine the height of the gage blocks to be placed under the ball supports. For this purpose, the first angle is that between horizontal and the line drawn from the intersection of the axes 73 and 77 to the center of the ball support mounted to the aperture 12. This angle is, of course, measured in a plane normal to the upper surface of the base 51. The second angle is that between the axis 73 and a line through intersection 89 and parallel to the underside of the sine plate, the angle being measured in a plane normal to the underside of the sine plate.

Where support blocks 29 (FIG. 2) are employed with the ball supports, the dimensions of the groove in the base and of the block 61 and the height of the flanges 62 are such that the axis 73 is above the surface a distance equal to the distance from the center of a support ball and the bottom of its associated support block. Where the support blocks are not to be used, the dimensions of the parts must be such that the axis 73 is above the upper surface of the base a distance equal to one half the diameter of the support ball.

It can be appreciated that once the proper attitude of the plate is attained by the proper application of the gage blocks, means should be provided for securing the plate in this attitude. One example of means which can be provided is shown in FIG. 8. An axial hole 92 can be drilled and tapped and counter sunk as at 93. Three longitudinal slots 94, 96, and 97 can be provided and extended into the hole 92. A screw 99 having a conical surface 101 thereon may be installed and used to spread the end sectors and thereby secure the hinge pins in their apertures. Other means for locking the sine plate in position can be used if desired.

Because of the compact construction of the sine plate of the present invention, it can be used on machine tools which are small by comparison with the size required when conventional compound sine angle plates are used. Yet the necessary accuracy can be obtained in the present invention though its individual parts lend themselves to economical manufacture.

The present invention is useful in a procedure known as angular indexing. This will be understood from the following description, reference being made to FIGS. 10 and 11. It is necessary from time to time to check the spacing between portions of a part which portions are disposed around a circle. For example, one may wish to check the spacing between bolt holes, gear teeth, pump vanes, or other details of a part. Where these details are disposed at an angle with respect to a principal face of the part, such as in the case of a helical gear tooth, it is helpful to place the part at an angle to check it, though ordinarily a special checking machine is required.

Figure 10:
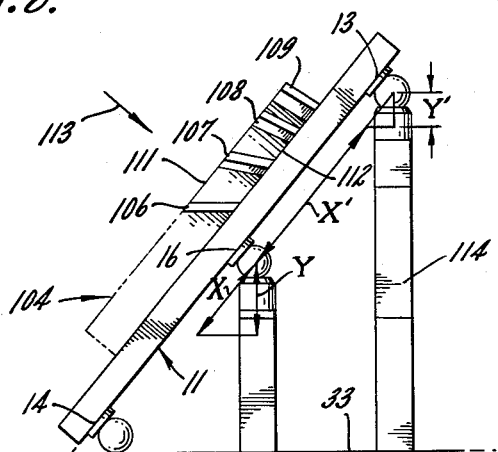
FIG. 10 is a side elevation of the sine plate set up with a workpiece for angular indexing.
Figure 11:
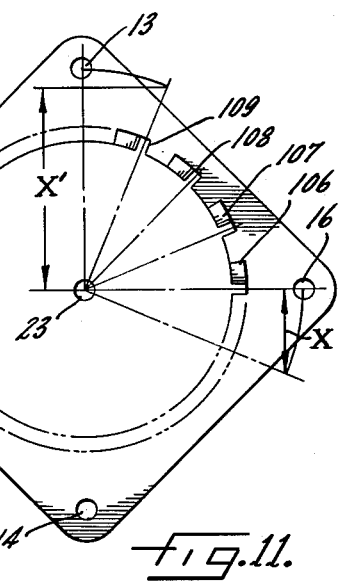
FIG. 11 is a view of the sine plate and workpiece of FIG. 10 looking perpendicular to the large plane surface of the sine plate.

Referring now to FIGS. 10 and 11, a part 104 has a plurality of vanes equally spaced around its circumference. Four of these vanes, 106 through 108, are shown. They are disposed at an angle with respect to the parallel faces 111 and 112 of the part. The part is secured by any suitable means (not shown) to the top of the sine plate 11. FIG. 11 is a view of the part and the sine plate as seen looking in the direction indicated by the arrow 113 in FIG. 10 which is normal to the upper face of the sine plate. It will be assumed for the purpose of example that each of the vanes is supposed to be 22½ degrees for each other.

A ball support is installed in each of the apertures 12, 13, 14, and 16. A stack 114 of gage blocks is placed under the ball support in aperture 13. The height of this stack is sufficient that a line through the centers of the highest and lowest balls intersects the top of the surface plate at an angle equal to the angle at which the vanes intersect the surfaces of the part 104.

With the part supported in this manner, the height of the stacks of gage blocks under the balls installed at the apertures 12 and 16 is exactly half the height of the stack 114. The pointer of a dial indicator can then be placed on the upper surface of the vane 106, the part 104 being precisely centered on the sine plate. The centering is of course facilitated by the aperture 23 in the center of the sine plate. The dial indicator can be zeroed on the vane 106.

It is then necessary to check the vane 107. To do this it is only necessary to rotate the sine plate with the part thereon in the plane of the sine plate an amount equal to 22½ degrees. Obviously it will then be necessary to reduce the height of the stack 114 by a certain amount and place a stack under the support in the aperture 14 of a height equal to the reduction in the height of the stack 114. Likewise it will be necessary to reduce the height of the stack under the ball support in the aperture 16 while increasing the height of the stack under the ball support in aperture 12 by an equal amount.

To determine the amount by which the stack under aperture 16 is reduced, the following procedure is effective. The distance between the center of aperture 23 and aperture 16 is multiplied by the sine of the angle between two of the vanes. This product gives the distance "X" in FIG. 11. This distance is then multiplied by the sine of the angle of inclination of the sine plate with respect to the top of the surface plate to give the distance "Y." The distance "Y" is the amount by which the stack under aperture 16 is reduced and the stack under the aperture 12 is increased.

To determine the amount Y' by which the stack 114 is to be lowered, it is necessary first to multiply the distance between the center of aperture 23 and aperture 13 by the cosine of the angle between the vanes. This product (X' in FIG. 11) is then subtracted from the distance between the apertures 23 and 13. The difference is then multiplied by the sine of the angle of inclination of the sine plate to the top of the surface plate. The product of these two factors Y', is then subtracted from the height of the original stack 114. This is also equal to the amount which must be placed under the lowermost ball support.

In further rotating the sine plate in the inclined plane to check the other vanes, the same procedure is followed. It will be readily appreciated that rather than make the above mentioned calculations each time the plate is to be turned a bit, tables can readily be prepared to facilitate the checking operation.

For the foregoing, it can be seen that the sine plate could be oriented at a compound angle with respect to the surface plate if the checking of the part so required.

Because of the centrally located aperture 23, the sine plate of the present invention facilitates the use thereof with a "V" block for indexing. A pin can be secured in the "V" of the block and the sine plate mounted on the pin by inserting the pin in the aperture 23. The sine plate, with the part to be checked secured thereto can then be rotated on the pin and the proper angular settings attained by selecting the proper height of the gage blocks to be placed under the ball supports in the corner apertures.

Because of the construction of the sine plate, it is also possible to compound across the diagonals. In this case the sine distance would be the distance between corner apertures measured diagonally.

Because of the construction of the sine plate of the present invention, it is also well adapted to employment as a radius size and location checker. For this purpose, it is convenient ot use the threaded apertures 19 in the sides for securing side rails to the plate. A pin may be inserted into the center aperture 23, and a dial indicator mounted thereto. The part may then be placed on the sine plate and located with respect to the edges thereof by the use of gage blocks between the side rails and the edges of the part. The curved surface may then be swept with the indicator to check the curved surface.

Figure 12:
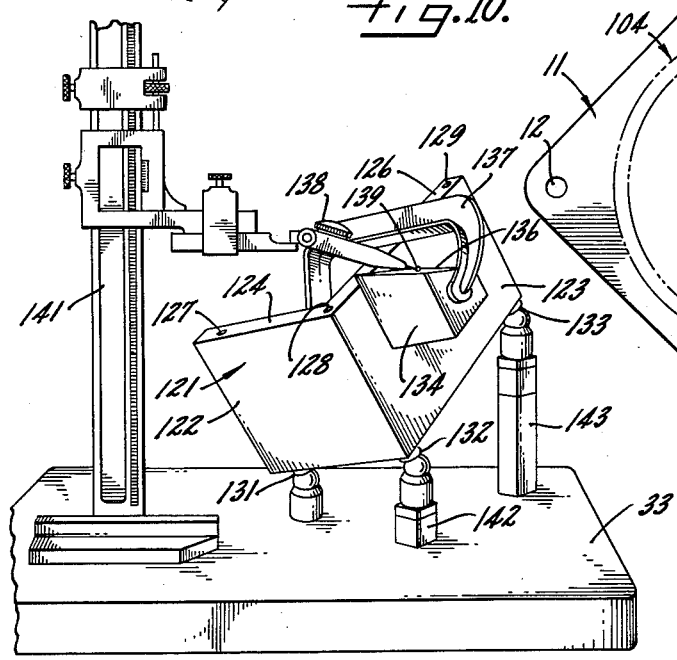
FIG. 12 is a perspective view of another embodiment of the invention with a part mounted thereto for checking.

FIG. 12 illustrates a further embodiment of my invention. In FIG. 12 a universal right angle plate or iron 121 has faces 122 and 123 at right angles. Edges 124 and 126 lying in the same plane normal to the faces 122 and 123, have the apertures 127, 128, and 129 therein. These apertures are the same size as apertures 12, 13, 14 and 16 in the sine plate of FIG. 1. Apertures 127 and 128 are located at a first sine distance. They are centered on a line parallel to the surface 122. Apertures 128 and 129 are located at a second sine distance apart. They are on a line parallel to the face 123.

Three identical apertures are located precisely in the same manner on the opposite edges of the plate. They therefore accommodate the supports 131, 132, and 133, which are identical to the ball supports 24 of FIG. 2. Workpiece 134 has a surface 136 thereon which is to be checked for proper orientation. The part is secured to the angle plate by some suitable means such as a "C" clamp 137, for example. A dial indicator 138 having pointer 139 is supported for movement over and parallel to the top of the surface plate by means of the vernier stand 141. The indicator pointer is swept across the surface 136 after gage blocks are placed in the stacks 142 and 143 to establish the designated first and second angles. The determination of the heights of the gage block stacks is made in the same manner and according to the same formulas as described above for the use of the sine plate of FIG. 1. The indicator reading then indicates the accuracy of orientation of the surface 136.

It will be readily appreciated at this point that the present invention is beneficial in many ways. It can be employed in a number of inspection and setup tools and gages other than those specifically mentioned herein.

Perhaps it would be well at this point to briefly summarize some of the various uses of the sine plate described herein. It can be used as a leveling plate to establish a plane by using jacks or gage blocks under the three support balls. It can be used as a single angle sine plate. It can be used as a compound angle sine plate, left-hand or right-hand without modification. It can be used as a spacing or index plate with a rod in the center aperture and the rod mounted in a "V" block. It can be used as a compound angle sine plate across diagonals both left and right hand. It can be used as a radius size and location checker with the indicator rod in the center hole. It can be used for angular indexing by changing gage blocks under the four balls, thus causing the plate to rotate around a center line while maintaining the angle of the plate with respect to a surface plate at a constant value.

While the invention has been disclosed and described in some detail herein, other variations exist and will occur to those skilled in the art and which are within the scope of the present invention. Therefore, I desire to protect not only that which has been specifically disclosed herein but also all reasonable equivalents and variations thereof within the scope of the appended claims.

What is claimed is:

1. The combination comprising: a base plate of ferromagnetic material and having upper and lower surfaces, said base plate having a groove in the upper surface thereof, said groove having a flat floor parallel to the said upper surface, and said plate having tapped holes opening in the floor of said groove near the opposite ends of the groove; a yoke member having two upstanding arms; screws received in said yoke member and threadedly received in certain of said holes near one end of said groove and securing said yoke member at a first location in said groove near one end thereof, said yoke being removable to a second location in said groove near the other end thereof upon removal of said screws from said certain holes and securable in said location by said screws when threadedly received in others of said holes near said other end of said groove, each of said arms having a circular aperture therethrough of precise dimensions, said apertures having colinear axes on a first line parallel to said upper surface; a pivot member including a pivot block received between said arms, said pivot block having a first cylindrical hinge pin therethrough and fixed thereto and extending from each end of said pivot block into said circular apertures with its axis colinear with said first line, said pivot block having a flat shoulder surface parallel to the axis of said first hinge pin, said pivot block having a second cylindrical hinge pin therein with its axis precisely perpendicular to said shoulder surface and intersecting said first line, said second hinge pin projecting outwardly from said shoulder surface; a sine plate having flat parallel upper and lower surfaces and five identical smooth walled cylindrical apertures therethrough, said apertures having axes perpendicular to said upper surface of said sine plate, the first and second sine plate apertures being on a second line and the first and third sine plate apertures being on a third line perpendicular to said second line, and the second and fourth sine plate apertures being on a fourth line perpendicular to said second line, the fifth sine plate aperture being on said fourth line between said second and fourth apertures and equidistant from said second and fourth apertures; a connector including an elongated strip and connector block affixed together, said connector block having an aperture therein fittingly receiving said second hinge pin, said strip having a flat upper face parallel to the axis of said second hinge pin, said connector including first and second parallel mounting pins affixed to said strip and having axes perpendicular to the said upper face of said strip, the axis of said first pin intersecting the axis of said second hinge pin, the axes of said mounting pins being spaced apart a sine distance equal to the distance between the axes of said first and second sine plate apertures, the first of said mounting pins being cylindrical and fittingly received in said first sine plate aperture, the second of said mounting pins being oblong in cross section, with its greatest cross-sectional dimension in a plane parallel to said face being disposed perpendicular to a line between said mounting pins and equal to the diameter of said first mounting pin, said second mounting pin being fittingly received in said second sine plate aperture, with threaded fasteners received in said sine plate and affixing said strip thereto, with said upper face abutting the lower surface of said sine plate, said upper surface of said sine plate being parallel to the axis of said second hinge pin, said fasteners being removable from said sine plate, and said sine plate being thereupon reversible with said first mounting pin receivable in said second sine plate aperture and said second mounting pin receivable in said first sine plate aperture; first and second supports, each including a cylindrical stem having a locating shoulder and a ball thereon, the stem of said first support being received in said third aperture and the stem of said second support being received in said fifth aperture, the centers of the balls of said first and second supports being coplanar with the axis of said second hinge pin and at a uniform distance from said upper surface of said sine plate; said connector block having parallel faces perpendicular to the axis of said second hinge pin and disposed on opposite sides of and equidistant from a plane containing the axes of said first and second mounting pins, one of said connector block faces abuttingly engaging said flat shoulder surface of said pivot member block, said parallel faces being so located with respect to said plane containing the mounting pin axes, and said flat shoulder surface being so located with respect to the intersection of the axis of said second pin with said first line, as to provide a sine distance from said intersection to the axis of said third sine plate aperture; two columns of gage blocks, each column standing on the upper surface of said base plate, a column supporting each of said support balls, said support balls being thereby supported at different elevations whereby said sine plate is supported in an attitude with respect to said base plate such that the upper surface of said sine plate is disposed at a compound angle with respect to said base plate, and locking means affixing said sine plate in said attitude, said locking means including an axially extending hole in one end of said first hinge pin and an axially extending hole in the end of said second hinge pin which is received in the aperture in said connector block, each hole being countersunk at the outer end thereof and screw threaded inwardly therefrom, each hinge pin having longitudinally extending slots extending radially from the hole therein to the external cylindrical surface thereof to facilitate spreading of the end of the pin, and locking screws, each locking screw threadedly received in the threaded hole in a pin and having a conical surface thereon engaging the countersink at the hole, said locking screws being operable, when tightened, to spread the hinge pins where received in apertures and prevent turning of the hinge pins in said apertures.

2. The combination comprising: a base plate having parallel upper and lower surfaces, said base plate having tapped holes therein; a yoke member having two upstanding arms; screws received in said yoke member and threadedly received in certain of said holes and securing said yoke member at a first location near one marginal edge of said base plate, said yoke being removable to a second location near another marginal edge of said base plate upon removal of said screws from said certain holes and securable in said second location by said screws when threadedly received in others of said holes, each of said arms having a circular aperture therethrough, said apertures having colinear axes on a first line parallel to said upper surface; a pivot member including a pivot block received between said arms, said pivot block having a first cylindrical hinge pin means extending from each end of said pivot block into said circular apertures with the first hinge pin axis colinear with said first line, said pivot block having a flat shoulder surface parallel to the said first hinge pin axis, said pivot block having a second cylindrical hinge pin therein with its axis perpendicular to said shoulder surface and intersecting said first line, said second hinge pin projecting outwardly from said shoulder surface; a sine plate having flat parallel upper and lower surfaces and a plurality of identical smooth walled cylindrical apertures therethrough, said apertures having axes perpendicular to said upper surface of said sine plate, first and second of said sine plate apertures being on a second line and the first and a third of said sine plate apertures being on a third line perpendicular to said second line; a connector including an elongated strip and a connector block affixed together, said connector block having an aperture therein fittingly receiving said second hinge pin, said strip having a flat upper surface parallel to the axis of said second hinge pin, said connector including first and second parallel upstanding mounting pins affixed to said strip and having axes perpendicular to the said upper surface of said strip, the axis of said first mounting pin intersecting the axis of said second hinge pin, the axes of said mounting pins being spaced apart a sine distance equal to the distance between the axes of said first and second sine plate apertures, the first of said mounting pins being cylindrical and fittingly received in said first sine plate aperture, the second of said mounting pins being fittingly received in said second sine plate aperture, with threaded fasteners received in said sine plate and affixing said strip thereto, with said upper face of said strip abutting the lower surface of said sine plate, said upper surface of said sine plate being parallel to the axis of said second hinge pin, said fasteners being removable from said sine plate, and said sine plate being thereupon reversible with said first mounting pin receivable in said second sine plate aperture and said second mounting pin receivable in said first sine plate aperture; first and second supports, each including a stem having a locating shoulder and a spherical surface thereon, the stem of said first support being received in said third aperture and the stem of said second support being received in a fourth of said sine plate apertures, said connector block having parallel faces perpendicular to the axis of said second hinge pin and disposed on opposite sides of and equidistant from a plane containing the axes of said first and second mounting pins, one of said connector block faces abuttingly engaging said first shoulder surface of said pivot member block, said parallel faces being so located with respect to said plane containing the mounting pin axes, and said flat shoulder surface being so located with respect to said intersection of the axis of said second pin with said first line as to provide a sine distance from said intersection to the axis of said third sine plate aperture, said sine plate being positionable in a desired attitude with respect to said base plate by two columns of gage blocks standing on the upper surface of said base plate, one column supporting each of said supports; and locking means affixing said sine plate in said attitude, said locking means including adjustable means wedging said hinge pins in the apertures in which they are received.

3. The combination comprising:

a base plate having parallel upper and lower surfaces;

a mounting member affixed to said base plate in a first position by first removable fastener means and said mounting member having mounting portion;

a pivot member pivotally mounted to said mounting member for pivoting thereon about a first axis parallel to said upper and lower surfaces, said pivot member having hinge means thereon with a second axis normal to and intersecting said first axis, and said pivot member having a first locator surface thereon at a constant distance from said first axis;

a connector pivotally mounted on said hinge means of said pivot member for pivoting thereon about said second axis;

and an angle plate affixed to said connector by second removable fastener means and disposed above said base plate and having a top surface parallel to said second axis, and having a first aperture therein normal to said top surface, said angle plate having second and third apertures therein parallel to said first aperture;

support means on said angle plate at known locations with respect to said axes and supportable by gage blocks when gage blocks are placed on said base plate to position said angle plate as desired;

said first and second apertures lying in a common plane perpendicular to said second axis, and said connector having a first pin and a second pin thereon, said first pin being fittingly disposed in said first aperture and said second pin being fittingly disposed in said second aperture to locate said angle plate on said connector, said angle plate being readily removable from said connector by removal of said second fastener means and reversible 180 degrees and thereupon fixable to said connector by said second fastener means with said first pin disposed in said second aperture and said second pin in said first aperture;

said mounting member being readily removable from said first position to a second position spaced therefrom on said base plate, by removal of said first fastener means, and fixable to said base plate in said second position by said fastener means;

said connector having second and third locator surfaces on opposite sides of and equidistant from a plane containing the axes of said first and second pins, said second locator surface abuttingly engaging said first locator surface;

said connector being readily removable from said hinge means of said pivot member and pivotally remountable thereon in a reversed position 180 degrees from its original position on said pivot member with said third locator surface abuttingly engaging said first locator surface;

said angle plate being thereby positionable above said base plate when said mounting member is in said second position for compounding in a direction opposite the direction of compounding possible when said mounting member is in said first position.

References Cited by the Examiner

UNITED STATES PATENTS

| | | | |
|---|---|---|---|
| 1,551,995 | 9/1925 | Lovenston | 33—174 |
| 2,306,227 | 12/1942 | Seidel | 33—174 |
| 2,324,476 | 7/1943 | Becker | 33—174 |
| 2,359,018 | 9/1944 | Balk | 33—174 |
| 2,595,424 | 5/1952 | Studler | 33—174 |
| 2,676,414 | 4/1954 | Derry | 33—174 |
| 2,688,828 | 9/1954 | Aulenbach | 33—174 |
| 2,812,586 | 11/1957 | Matthews | 33—174 |
| 2,828,589 | 4/1958 | Hercik | 33—174 |
| 3,061,935 | 11/1962 | De Witt | 33—174 |
| 3,075,291 | 1/1963 | Robertson | 33—174 |

FOREIGN PATENTS

| | | |
|---|---|---|
| 569,560 | 5/1945 | England. |
| 582,117 | 11/1946 | England. |

ISAAC LISANN, *Primary Examiner.*

LEONARD FORMAN, *Examiner.*